United States Patent
Akinwande et al.

(10) Patent No.: US 11,769,004 B2
(45) Date of Patent: Sep. 26, 2023

(54) GOAL-ORIENTED CONVERSATION WITH CODE-MIXED LANGUAGE

(71) Applicant: International Business Machines Corporation, Armonk, NY (US)

(72) Inventors: Victor Abayomi Akinwande, Nairobi (KE); Celia Cintas, Nairobi (KE); Aisha Walcott, Nairobi (KE); William Ogallo, Nairobi (KE); Sekou Lionel Remy, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 16/732,708

(22) Filed: Jan. 2, 2020

(65) Prior Publication Data
US 2021/0209299 A1    Jul. 8, 2021

(51) Int. Cl.
G06F 40/20    (2020.01)
G06N 3/04     (2023.01)
G06N 3/044    (2023.01)
G06N 3/045    (2023.01)

(52) U.S. Cl.
CPC .......... G06F 40/20 (2020.01); G06N 3/044 (2023.01); G06N 3/045 (2023.01)

(58) Field of Classification Search
CPC ........ G06F 40/20; G06N 3/04; G06N 3/0454
See application file for complete search history.

(56) References Cited

U.S. PATENT DOCUMENTS

| 8,473,315 | B1 | 6/2013 | Lucchino |
| 2010/0223341 | A1 | 9/2010 | Manolescu et al. |
| 2014/0201126 | A1* | 7/2014 | Zadeh ............ G06N 7/00 706/552 |
| 2014/0364232 | A1* | 12/2014 | Sadeghi .......... G06F 19/00 705/2 |

(Continued)

FOREIGN PATENT DOCUMENTS

JP    2002-342484 A    11/2002

OTHER PUBLICATIONS

Berger, J. O., "Chapter 5: Minimax Analysis", Statistical Decision Theory and Bayesian Analysis, Second Edition, 1985, pp. 308-387.

(Continued)

Primary Examiner — Richemond Dorvil
Assistant Examiner — Ethan Daniel Kim
(74) Attorney, Agent, or Firm — Scully, Scott, Murphy & Presser, P.C.; Shimon Benjamin

(57) ABSTRACT

A computer system may create a language model corpus including multilingual alignment for training a combined language model and train (or pre-train) the combined language model. The computer system may create an adverse medication reaction corpus to include adverse medication reaction utterances and label an N-gram of an utterance in the adverse medication reaction utterances as a response to query, for multiple N-grams. The computer system may generate a code-mixed utterance model to perform code-mixed utterances in a turn by turn dialogue, by at least adding additional output layer including at least a start vector, language vector, and a query vector including at least the labeled N-gram, which are additional to the combined language model's predicted next words.

17 Claims, 7 Drawing Sheets

(56) References Cited

U.S. PATENT DOCUMENTS

| | | | | |
|---|---|---|---|---|
| 2014/0365232 | A1* | 12/2014 | Sadeghi | G06F 19/00 |
| | | | | 705/2 |
| 2015/0207765 | A1 | 7/2015 | Brantingham et al. | |
| 2015/0261931 | A1 | 9/2015 | Chiu et al. | |
| 2016/0042359 | A1 | 2/2016 | Singh | |
| 2016/0330084 | A1* | 11/2016 | Hunter | H04L 12/24 |
| 2018/0350395 | A1* | 12/2018 | Simko | G10L 25/78 |
| 2020/0294642 | A1* | 9/2020 | Bostic | G16H 20/10 |
| 2020/0334252 | A1* | 10/2020 | Lee | G06F 16/2452 |
| 2020/0372106 | A1* | 11/2020 | Liu | G06F 17/27 |
| 2021/0166802 | A1* | 6/2021 | Neumann | G16H 20/60 |

OTHER PUBLICATIONS

Banerjee, S., et al., "A Dataset for Building Code-Mixed Goal Oriented Conversation Systems", Proceedings of the 27th International Conference on Computational Linguistics, Aug. 20-26, 2018, pp. 3766-3780.

Gupta, S., "Towards Understanding Code-Mixed Social Media Text", International Institute of Information Technology, Aug. 2016, 50 pages.

Bickmore, T., et al., "Health dialog systems for patients and consumers", Journal of Biomedical Informatics (2006), Available on line Jan. 20, 2006, pp. 556-571, vol. 39.

Farqui, M., et al., "Impriving Vector Space Word Representations Using Multilingual Correlation", 14th Conference of the European Chapter of the Association for Computational Linguistics 2014, EACL 2014, Jan. 2014, 10 pages.

Hermann, K.M., et al., "Multilingual Models for Compositional Distributed Semantics", Proceedings of the 52nd Annual Meeting of the Association for Computational Linguistics, Jun. 23-25, 2014, pp. 58-68.

Luong, M.-T., et al., "Bilingual Word Representations with Monolingual Quality in Mind", Proceedings of NAACL-HLT 2015, May 31-Jun. 5, 2015, pp. 151-159.

Lample, G., et al., "Unsupervised Machine Translation Using Monolingual Corpora Only", Published as a conference paper at ICLR 2018, arXiv:1711.00043v2, Apr. 13, 2018, 14 pages.

NIST, "NIST Cloud Computing Program", http://csrc.nist.gov/groups/SNS/cloud-computing/index.html, Created Dec. 1, 2016, Updated Oct. 6, 2017, 9 pages.

* cited by examiner

GOAL-ORIENTED CONVERSATION WITH CODE-MIXED LANGUAGE

BACKGROUND

The present application relates generally to computers and computer applications, and more particularly to automated goal-oriented conversation with code-mixed language and machine learning techniques for generating goal-oriented conversation, for example, for adverse reaction detection to medication.

By way of example, the detection and early intervention of adverse reactions to medication can be important for ensuring the safety and effectiveness of medications. This activity can be of particular interest since no treatment is fully void of adverse effects and treatments have generally become increasingly complex with continued scientific research. Traditionally, adverse reactions are detected using a variety of approaches such as spontaneous reporting of individual cases, expert review of case report collections, and cohort event monitoring.

Despite these efforts, the effective identification and intervention of adverse medication reactions remains a challenge. For example, early identification of adverse medication reactions requires timely assessment of signs and symptoms experienced by patients, yet it is difficult to monitor the use of medications by patients between clinic visits. Furthermore, settings with high disease burdens, high patient-to-provider ratios, and inadequate healthcare infrastructure often lack the capacity to adequately collect and report adverse medication reaction data.

BRIEF SUMMARY

In embodiments, a system and method for an automated conversation with code-mixed language can be provided. The system, in one aspect, may include a hardware processor and a memory device coupled with the hardware processor. The hardware processor can be configured to create a language model corpus including at least multilingual alignment for training a combined language model. For example, the language model corpus can be created from data sourced from a computer network and train the combined language model. The hardware processor can also be configured to create an adverse medication reaction corpus by analyzing data from online sources which include adverse medication reaction utterances and labeling an N-gram of an utterance in the adverse medication reaction utterances as a response to query. The hardware processor can also be configured to generate a code-mixed utterance model to perform code-mixed utterances in a turn by turn dialogue, by at least adding additional output layer including at least a start vector, language vector and a query vector including at least the labeled N-gram, which are additional to the combined language model's predicted next words.

A method, in one aspect, can include creating a language model corpus including multilingual alignment for training a combined language model, the language model corpus created from data sourced from a computer network and train the combined language model. The method can also include creating an adverse medication reaction corpus by analyzing data from online sources which include adverse medication reaction utterances and labeling an N-gram of an utterance in the adverse medication reaction utterances as a response to query. The method can further include generating a code-mixed utterance model to perform code-mixed utterances in a turn by turn dialogue, by at least adding additional output layer including at least a start vector, language vector, and a query vector including at least the labeled N-gram, which are additional to the combined language model's predicted next words.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
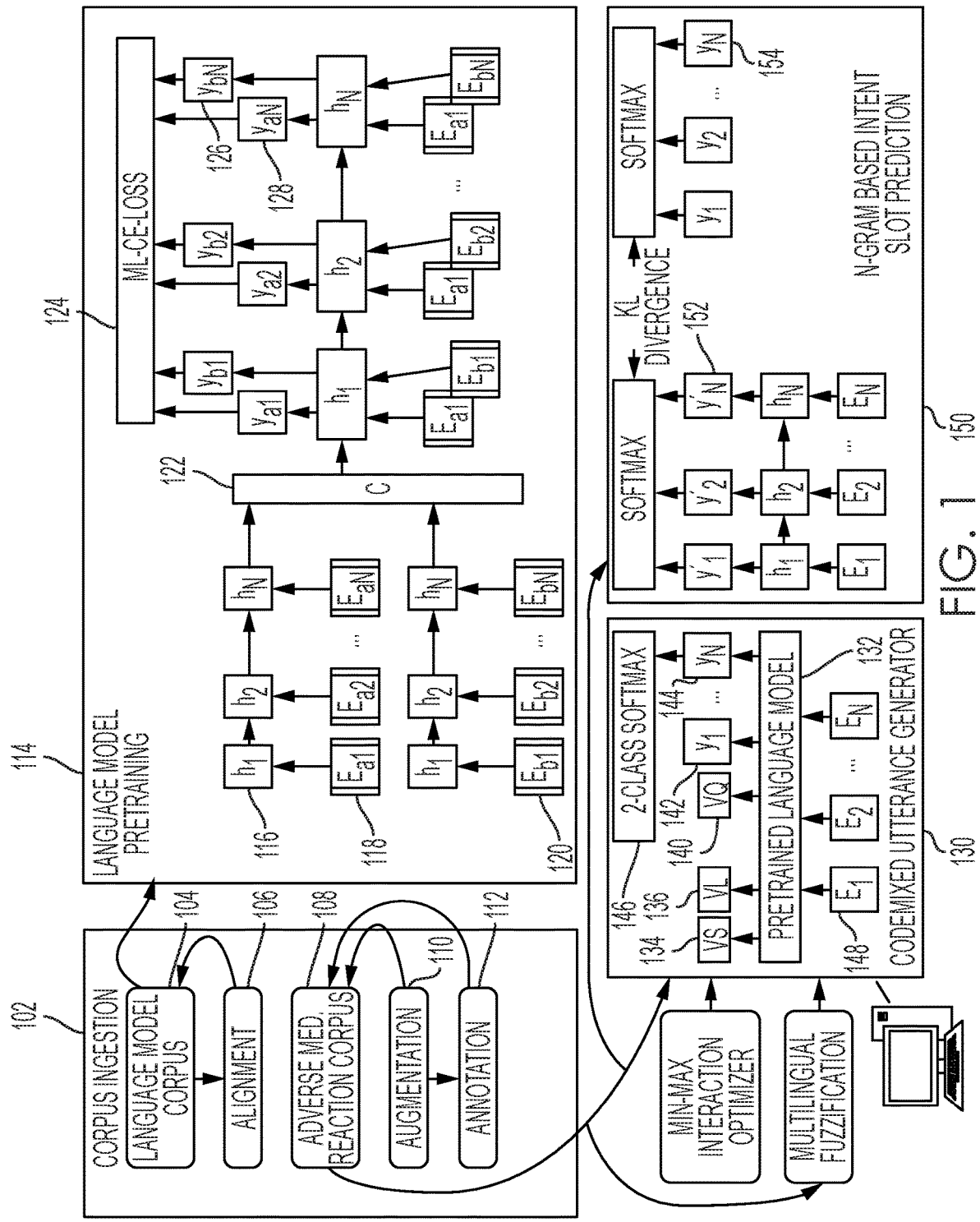
FIG. 1 is a diagram illustrating system components in one embodiment.

Methods and systems may be provided to automatically generate code-mixed goal-oriented conversations, for instance, to identify potential adverse medication events (ADE) based on the patient health care information (e.g., a data on a health wallet, which can be made available and accessibly by permission), medication regimen, social determinants of health, location, and other information. In an embodiment, the method programmatically generates one or more responses to the history messages based on the feature vector, each suggested response being a conversational reply to the previous message guaranteed to be fastest to converge to the objective, in this case, extracting information about secondary effects of medication. In an embodiment, generating the suggested responses includes determining probabilities associated with word sequences for the feature vector using a model trained with previous health conversations which include code-mixing (for example, Swahili-English). In an embodiment, given N number of interactions in a conversation, the method can extract a response regarding a specific side effect, e.g., side effect Q. The method causes the suggested responses to be posted in the messaging application as one or more messages to the patient. Briefly, code-mixed or code-switched conversation refers to a conversation performed using multiple languages, for example, a bilingual or multilingual conversation in which two or more languages are spoken or used in a mixed manner in a conversation.

In embodiments, the systems and methods may analyze individual text-based and voice-based outreach conversations to identify potential adverse medication reactions reported by patients; automatically and promptly determine the necessary actions (e.g., case escalation to experts) individual patients/caregivers, and care providers should take in the event of suspected adverse medication reactions. The systems and methods may provide for identifying and/or predicting potential adverse medication reactions from code-switched and code-mixed dialogue data; goal-oriented guiding of conversations in code-switching and code-mixing adverse medication reaction dialogues; reporting and escalating signals of potential adverse medication reactions identified from code-switched and code-mixed dialogue data; and/or optimizing number of interactions based on code-mix conversations.

In an embodiment, a system and/or method can enable goal-oriented conversation with the goal of extracting information about adverse medication reactions while being able to adapt to a bilingual context where language in the aforementioned conversation is code-mixed. The method, for example, may include preparing a language model corpus including multilingual alignment of the such corpus, preparing an adverse medication reaction corpus including automated annotation and augmentation of such corpus, extracting intents from utterances in the conversation, factoring the communication preference (context) of the user (language and degree of terseness), multilingual fuzzification of n-grams to identify domain specific terms. Techniques to adapt these to code-mixed context are also disclosed. An N-gram refers to a sequence of N words.

FIG. 1 is a diagram illustrating system components in one embodiment. The components shown include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

The system may perform data ingestion 102, which composes data. In an embodiment the system may prepare a corpus <C> for training a combined language model for at least two (2) languages: <Lang A>, and <Lang B> by using free text obtained from one or more data sources, e.g., the World Wide Web ("web") and/or other data sources. Examples of data sources may include, but are not limited to, one or more of platform sites such as WIKIPEDIA, WEBTEXT2, REDDIT, and KANGPE., for example, in which an alignment exists between the both (or multiple) languages. In cases where no such alignment exists the system may perform an alignment of the text from both languages through adversarial learning of a linear mapping between both languages in the embedding space and refining such alignments using a Procrustes transformation (a statistical shape analysis) or geometric transformation. For example, the system prepares a language model corpus 104 and its alignment 106. A language model corpus 104 represents text in a first language and a corresponding alignment 106 represents corresponding text in a second language.

In an embodiment, the system may prepare a corpus for adverse medication reaction (ADR) detection, <$C_{adr}$>, by sourcing from a plurality of data sources where ADR utterances may be mentioned such as online forums (e.g., KANGPE), social media, etc., and perform an automated annotation on unlabeled utterances using an long-short term memory (LSTM) trained on annotated utterances to predict annotation positions on the unlabeled utterances. For example, the system prepares an adverse medication reaction corpus 108 and annotation 112. In an embodiment, N-grams in each utterance are labeled as containing the response to one of seven (7) intent slot queries <Q>: the medication that caused the ADR, the resulting side effect, the severity level (mild or severe), the duration of the reaction, the original illness for which the medication was taken, the ingestion date of the medication, and the timeframe or date when the reaction began. The system may augment the annotated corpus by using a data augmentation technique. e.g., Backtranslation which paraphrases the utterances and uses the paraphrase as extra training example such that utterances from <Lang A> is translated to <Lang B> and vice versa and the resulting translation is translated back to the original language. For example, the system generates augmentation 110 by generating paraphrases of utterances in initial adverse medication reaction corpus and translating the generated paraphrases from a first language to a second language, then from second language back to the first language. The system may augment the initial adverse medication reaction corpus with the generated paraphrases in both languages. The system may augment the initial adverse medication reaction corpus with other additional data.

In an embodiment, the system may perform a multilingual pre-training of a language model including at least training a language model <LM> on the utterances in corpus <C>, where a special token <LANG <A|B>> is placed before each input and <sep> before the next utterance, using a self-attention recurrent neural network (RNN) with input embedding pairs for both words and sentences in <Lang A> and <Lang B> by minimizing a combined loss of the multilingual cross entropy loss <M-CEL> (also referred to as ML-CE-loss) 124 and the next utterance prediction loss. In an embodiment, the <M-CEL> 124 is defined to be a 4-way cross entropy of the predicted distribution over the vocabulary for the next word and the actual distribution in <Lang A> and <Lang B> done for each pair of aligned words in the input. For example, referring to FIG. 1, the system performs language model pre-training 114, for example, training an RNN as a language model. In the figure, the notations "$h_1$" ... "$h_N$" 116 represent a sequence of states. A sequence of words, "$E_{a1}$" ... "$E_{aN}$" 118 represent a sequence of words (e.g., a sentence) in first language; "$E_{b1}$" ... "$E_{bN}$" 120 represent a sequence of words in second language; "$y_{a1}$" "$y_{aN}$" 128 represent a predicted next word in the first language given the sequence of words; "$y_{b1}$" ... "$y_{bN}$" 126 represent a predicted next word in the second language given the sequence of words. A sequence is denoted by or represented by "1" to "N", also referred to as a time series from time 1 to time N. "C" 122 represents a language corpus including sequences of words in multiple languages (e.g., the first language and the second language) with embedded tokens. An RNN predicted next words can be compared with the actual next words, and the loss 124 between the predicted and actual next words can be minimized.

In an embodiment, the system may utilize the corpus <$C_{adr}$> to train an intent slot prediction model such that any given utterance is evaluated for the presence of responses to one or more of the 7 intent slot queries <Q>. The model may be a variant of an RNN trained by minimizing the Kullback—Leibler (K-L) divergence of the predicted distribution over <Q> and its actual distribution for every n-gram in the utterance. For example, the system may perform n-gram based intent slot prediction 150. The system may train an RNN, which minimizes K-L divergence of the predicted distribution 152 representing predicted intent slot queries and corresponding actual distribution 154 for every n-gram in the utterance.

In an embodiment, the system may train a code-mixed utterance generator model <UG> with the ability to condition its responses based on the language, context of the user, e.g., (terseness) and missing intent slots by including an additional output layer on <LM> with a start vector <$S_v$>, language vector <$L_v$>, a context vector <$Q_v$> and a slot query vector <$Q_v$>. The weights of new model maybe be initialized with the weights from <LM> and fine-tuned by training on the code-mixed corpus, <$C_{adr}$> with the objective of predicting a binary class <IsNext> for the utterance after a separator token <sep>. The loss function of the model may be 2-class softmax such that the probability of the next utterance being a logical utterance with respect to the previous utterance is maximized. For example, a code-mixed utterance generator 130 generates a code-mixed utterance generator model <UG>, which includes an additional output layer (e.g., the current output from the language model) on a pre-trained language model 132. In an embodiment, the additional layer can include a start vector "VS" 134, language vector "VL" 136, and a slot query vector "VQ" 140, which are in addition to the pre-trained language model's predicted next words "$y_1$" 142 . . . "$y_N$" 144. The input to the pre-trained language model 132 includes a code-mixed utterance (e.g., word sequence or sentence) 148. A "2-class softmax" 146 represents the loss function of the code-mixed utterance generator model. In an embodiment, the start vector 134 encodes what word should start the response to an input utterance. The probability of a word being the start word can be given to be:

$$P_i = \frac{e^{VS \cdot T_i}}{\sum_j e^{VS \cdot T_j}},$$

where T indicates the token embedding of the word.

In an embodiment, the language vector 136 encodes what language should the response be in. The probability of the next word being in a given language can be given to be:

$$P_i = \frac{e^{VL \cdot S_i}}{\sum_j e^{VL \cdot S_j}},$$

where S indicates the sentence embedding of the word.

In an embodiment, the slot query vector 140 encodes what intent slot is yet to be filled (e.g., or for which no answer has been provided in the dialog), e.g., determined to be the embedding of the missing slot from the intent slot prediction model 150 given all the utterance in the dialog thus far.

In an embodiment, the system may perform a multilingual fuzzification of the n-grams predicted to contain references <R> to a medication, side-effect and/or illness. The system may utilize a medical ontology in <Lang A> to match such references and may translate references in <Lang B> to <Lang A> before computing a similarity measure, e.g., cosine similarity with terms or the definitions of terms in the ontology. Furthermore, the system may perform a fuzzification and date conversion of n-grams predicted to contain references to the ingestion date of the medication, date when the reaction began or duration of the reaction, for example, a n-gram like "2-days ago" is converted to an actual date such as "Jan. 6, 2019". In an embodiment, the system may achieve this by using temporal indicators such as (days ago, days later, etc.) and numeric indicators in the n-gram to determine an integer or range of integers for which to add to the current date. For example, the system may perform multilingual fuzzification 156 of n-grams, whose results can be used as part of the training data for training the code-mixed utterance model. The output of this fuzzification 156 can be used as part of the training data at 130.

In an embodiment, the system may guide the conversation performing an optimization to gain maximum possible information gain with minimum interaction steps. In an embodiment, this can be achieved with a minimax estimator. An estimator is called minimax with respect to a risk function R (θ, δ), if it obtains the smallest maximum risk among all estimators. Minimizing $D_{KL}$ (obtained_data, gt_data), between a given ground truth data distribution and the data gain at iteration t. "obtained_data" represents the collected data at moment t at training time. "gt_data" represents ground-truth data at training time. Furthermore, a target iteration number is set as $t_{iters}$ if $D_{KL}$ (obtained_data, gt_data)<=$h_0$ and t<=$t_{iters}$ the conversation is finished as the necessary data was acquired. "$h_0$" represents the divergence value needed to ensure that the collected data is sufficient. "t" represents the current iteration and "$t_{iters}$" represents the maximum allowed or configured iterations. If t>$t_{iters}$ a penalization is applied and a set of direct conversations is generated. $D_{KL}$ represents Kullback-Leibler divergence between the obtained data and the ground truth (during the training step). If the divergence is lower or equal to a configured or predefined threshold and the amount of iterations is no larger than the maximum allowance, the algorithm stops as the necessary data has been collected. A min-max interaction optimizer 158 may perform this optimization. In an embodiment, the module 158 guides the topics/questions that should be part of the generated sentence in the conversation to gain information regarding a particular side effect, toward a smaller $D_{KL}$ and the iteration t lower than $t_{iters}$.

Figure 2:
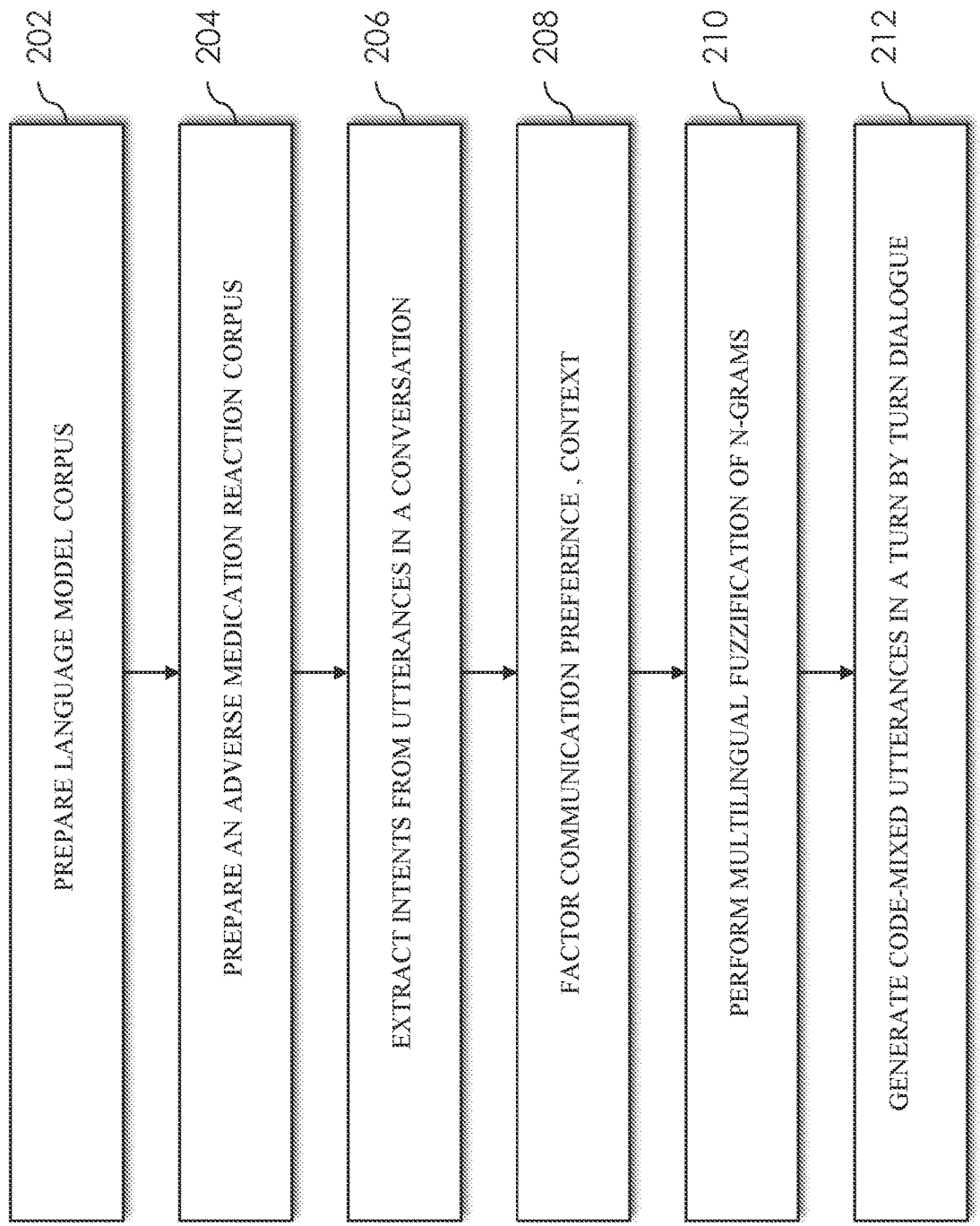
FIG. 2 is a flow diagram illustrating a method in one embodiment.

FIG. 2 is a flow diagram illustrating a method in one embodiment. In an embodiment, the method enables goal-oriented conversation with a goal of extracting information about adverse medication reactions while being able to adapt to a bilingual context where language in the aforementioned conversation is code-mixed. The method can be performed by one or more hardware processors, or for example, a computing device, which may include one or more hardware processors. A processor, for example, may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

At 202, the method may include preparing or creating a language model corpus including multilingual alignment of the language model corpus. The method may create or prepare a corpus <C> for training a combined language model for at least two (2) languages: <Lang A>, and <Lang B> by using free text obtained from one or more data sources, e.g., a computer network such as the World Wide Web ("web") and/or other data sources. The data sources may include an alignment of text in multiple languages. In an embodiment, for example, in cases where no such alignment exists, the method may include performing an alignment of the text from multiple languages through adversarial learning of a linear mapping between the languages in the embedding space and refining such alignments using, for example, a Procrustes transformation (a statistical shape analysis) or geometric transformation. The method may include training a combined language model using the corpus.

At 204, the method may include preparing an adverse medication reaction (ADR) corpus including automated annotation and augmentation of the adverse medication reaction corpus. For example, the method may include sourcing from a plurality of data sources where ADR utterances may be mentioned such as online forums, social media, and other platforms or other sources. The method may include performing an automated annotation on unlabeled utterances, e.g., using an long-short term memory (LSTM) trained on annotated utterances, to predict annotation positions on the unlabeled utterances. Annotating may include labeling an N-gram in an utterance as containing a response to at least one of a predefined queries, for example, a response to one of seven (7) intent slot queries <Q>: the medication that caused the ADR, the resulting side effect, the severity level (mild or severe), the duration of the reaction, the original illness for which the medication was taken, the ingestion date of the medication, and the timeframe or date when the reaction began. Augmenting may include generating and adding paraphrases of an utterance in multiple languages, for example, as described above with reference to 110 in FIG. 1.

At 206, the method may include extracting intents, for example, which relate to the 7 intent slot queries <Q>, from utterances in a conversation. In an embodiment, a natural language processing which includes parsing tokens in a language can be used to extract intents.

At 208, the method may include factoring a communication preference and/or context of the user, for example, the preferred language and degree of terseness. In an embodiment, a natural language processing which includes parsing tokens in a language can be used to factor a communication preference and/or context. Such communication preference and/or context can be used to train the multilingual language model.

At 210, the method may include performing multilingual fuzzification of n-grams to identify domain specific terms. For example, a technique described above with reference to 156 in FIG. 1 can be performed for multilingual fuzzification.

At 212, the method may include generating code-mixed utterances in a turn by turn dialogue. For instance, a technique described above with reference to the code-mixed utterance generator 130 in FIG. 1, can be used to generate a code-mixed utterance model, which can generate code-mixed utterances in a turn by turn dialogue.

The method may also include requesting rephrase in other language for clinical concepts, target conversation to get adverse medication events, which can also be used by the code-mixed utterance generator.

Depending on the user responses during the conversation the objective of the conversation can be updated. In an embodiment, the update can be performed based on other applications such as customer service chatbots, which can provide a set of fixed objectives.

In an embodiment, the method may include minimizing interaction and maximizing information to avoid engagement deterioration.

Figure 3:
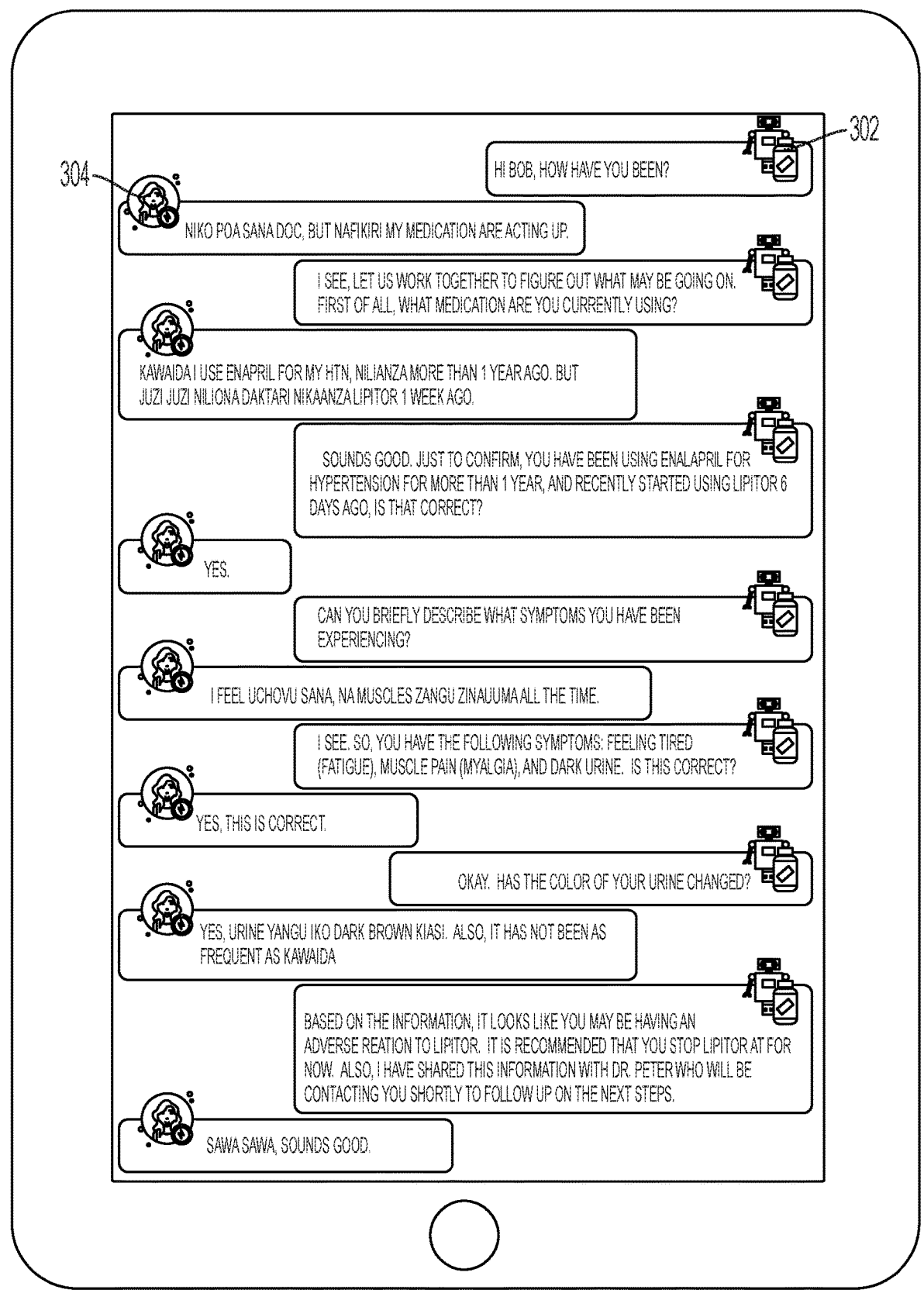
FIG. 3 shows a sample conversation between an automated conversation bot and a user in an embodiment.

FIG. 3 shows a sample conversation between an automated conversation bot and a user in an embodiment. Based on the analytics performed as illustrated above, for example, an automated conversation bot 302 (e.g., running the generated code-mixed utterance model) is able to carry on a dialogue with a user 304 to detect adverse medication reaction and recommend a possible action. The conversation bot 302 in an embodiment is able to understand the user's utterances in mixed language (e.g., 2 or more different languages).

Figure 4:
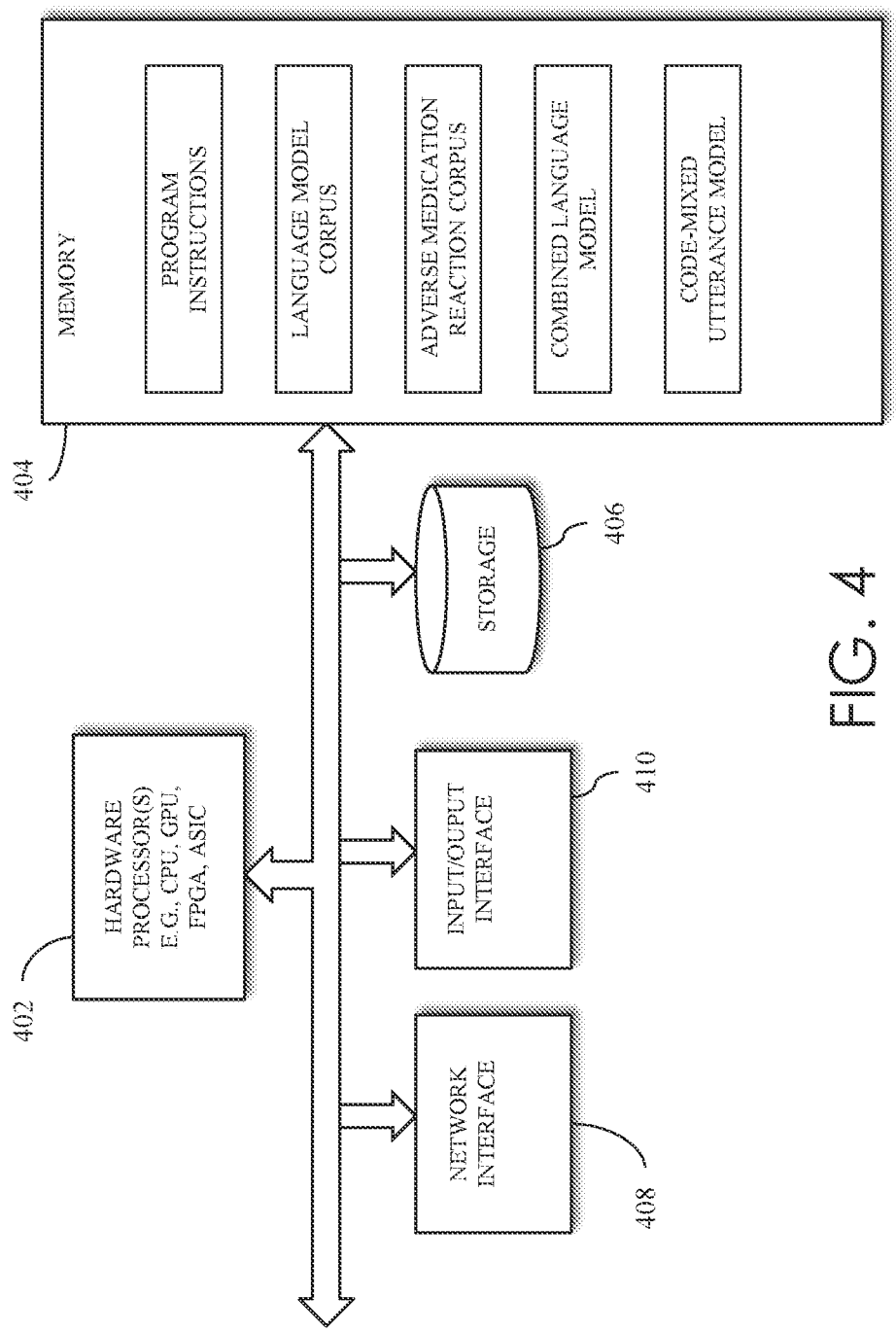
FIG. 4 is a diagram showing components of a system in one embodiment, which can provide goal-oriented conversation with code-mixed language to detect adverse medication reaction.

FIG. 4 is a diagram showing components of a system in one embodiment, which can provide goal-oriented conversation with code-mixed language to detect adverse medication reaction. One or more hardware processors 402 such as a central processing unit (CPU), a graphic process unit (GPU), and/or a Field Programmable Gate Array (FPGA), an application specific integrated circuit (ASIC), and/or another processor, may be coupled with a memory device 404, and generate a prediction model and recommend communication opportunities. A memory device 404 may include random access memory (RAM), read-only memory (ROM) or another memory device, and may store data and/or processor instructions for implementing various functionalities associated with the methods and/or systems described herein. One or more processors 402 may execute computer instructions stored in memory 404 or received from another computer device or medium. A memory device 404 may, for example, store instructions and/or data for functioning of one or more hardware processors 402, and may include an operating system and other program of instructions and/or data. One or more hardware processors 402 may create a language model corpus and an adverse medication reaction corpus. At least one hardware processor 402 may generate or pre-train a combined language model using the language model corpus. At least one hardware processor 402 may generate or train a code-mixed utterance model, which may include the combined language model and an additional output layer including at least a vector associated with the adverse medication reaction corpus. Corpus data may be stored on a storage device 406 or received via a network interface 408 from a remote device, and may be temporarily loaded into a memory device 404 for building or generating the combined language model and/or the code-mixed utterance model. The learned model or models may be stored on a memory device 404, for example, for execution by one or more hardware processors 402. One or more hardware processors 402 may be coupled with interface devices such as a network interface 408 for communicating with remote systems, for example, via a network, and an input/output interface 410 for communicating with input and/or output devices such as a keyboard, mouse, display, and/or others.

Figure 5:
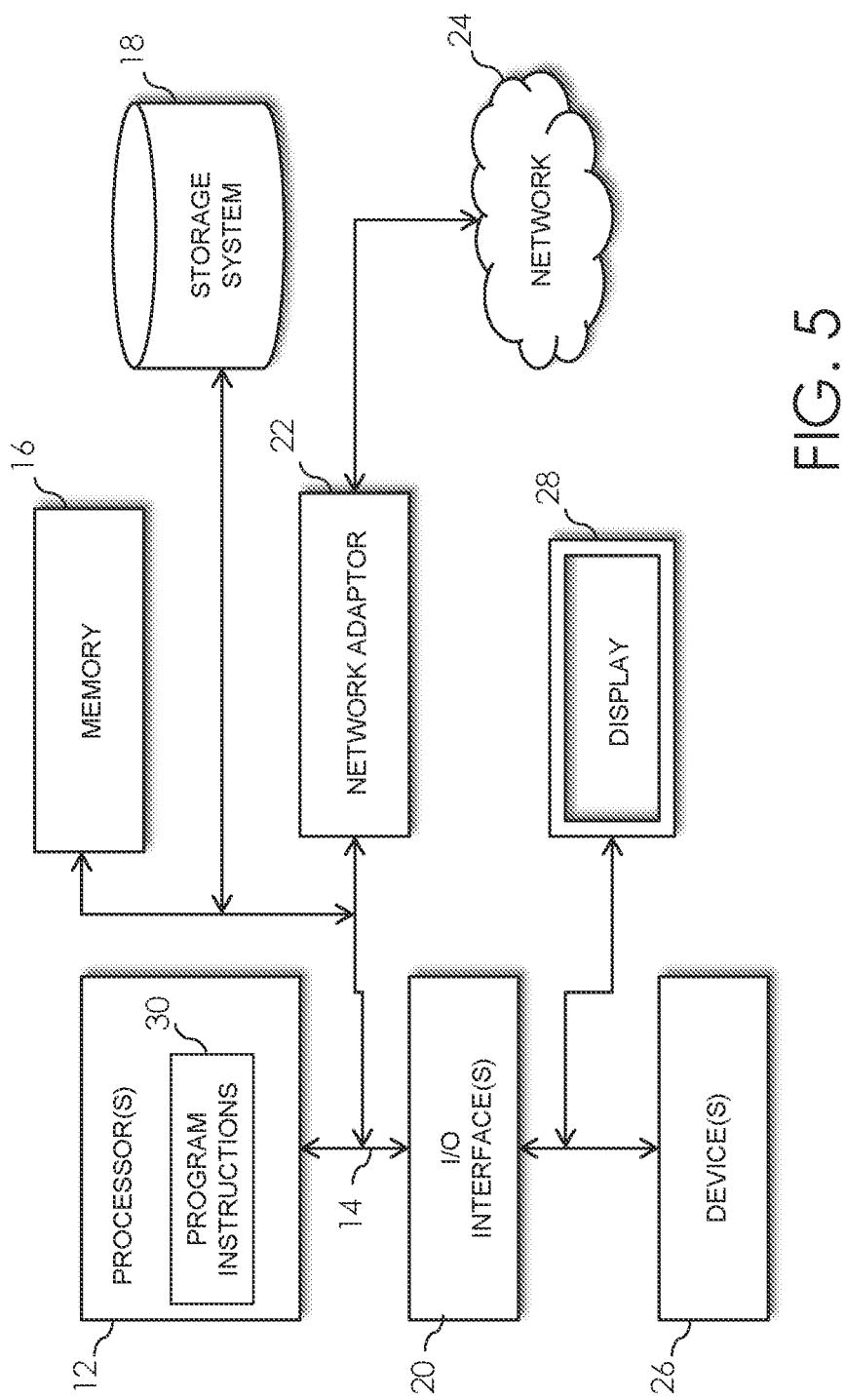
FIG. 5 illustrates a schematic of an example computer or processing system that may implement a code-mixed utterance system, for adverse medication reaction, in an embodiment.

FIG. 5 illustrates a schematic of an example computer or processing system that may implement a code-mixed utterance system, for adverse medication reaction, in an embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
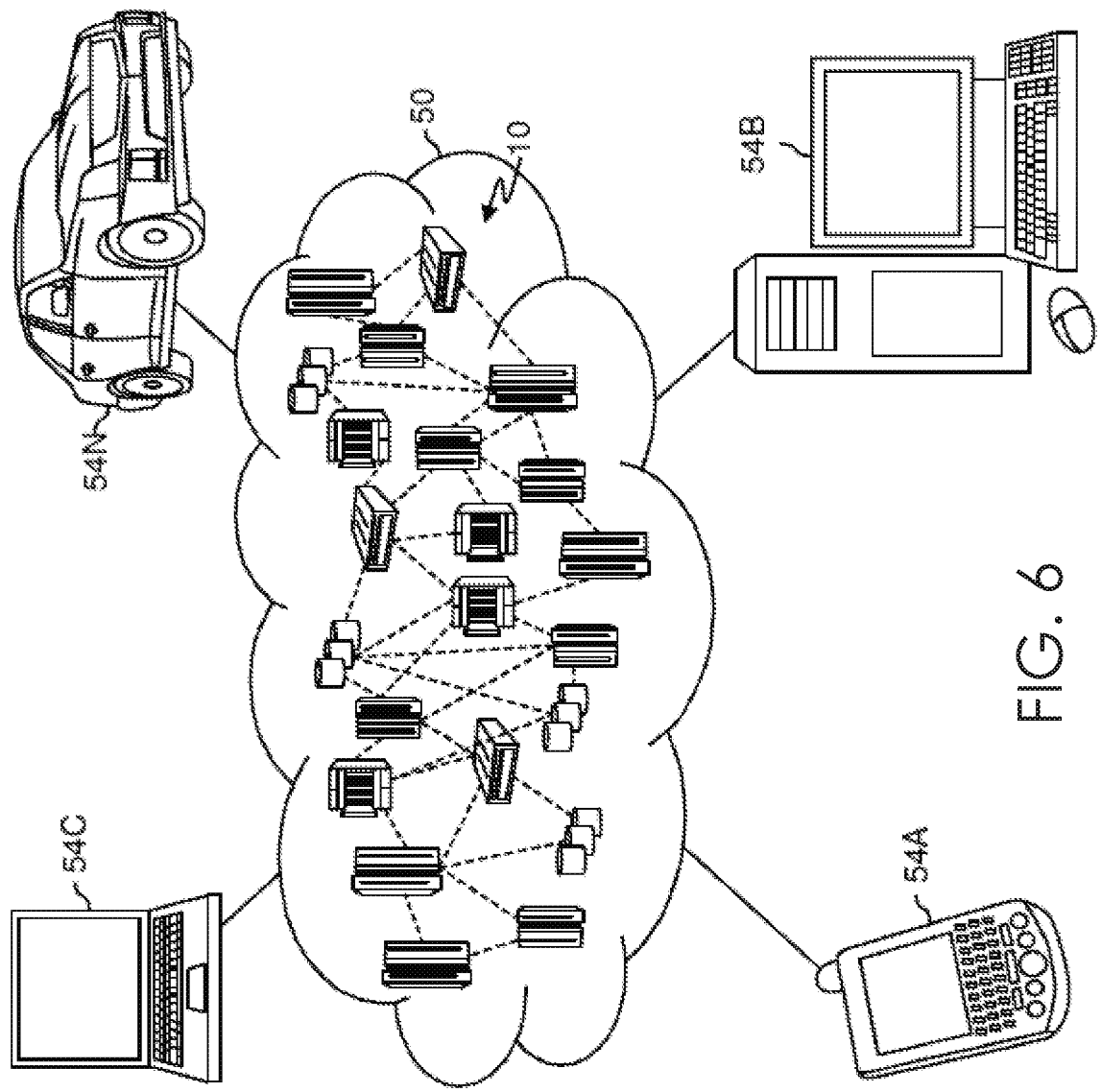
FIG. 6 illustrates a cloud computing environment in one embodiment.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
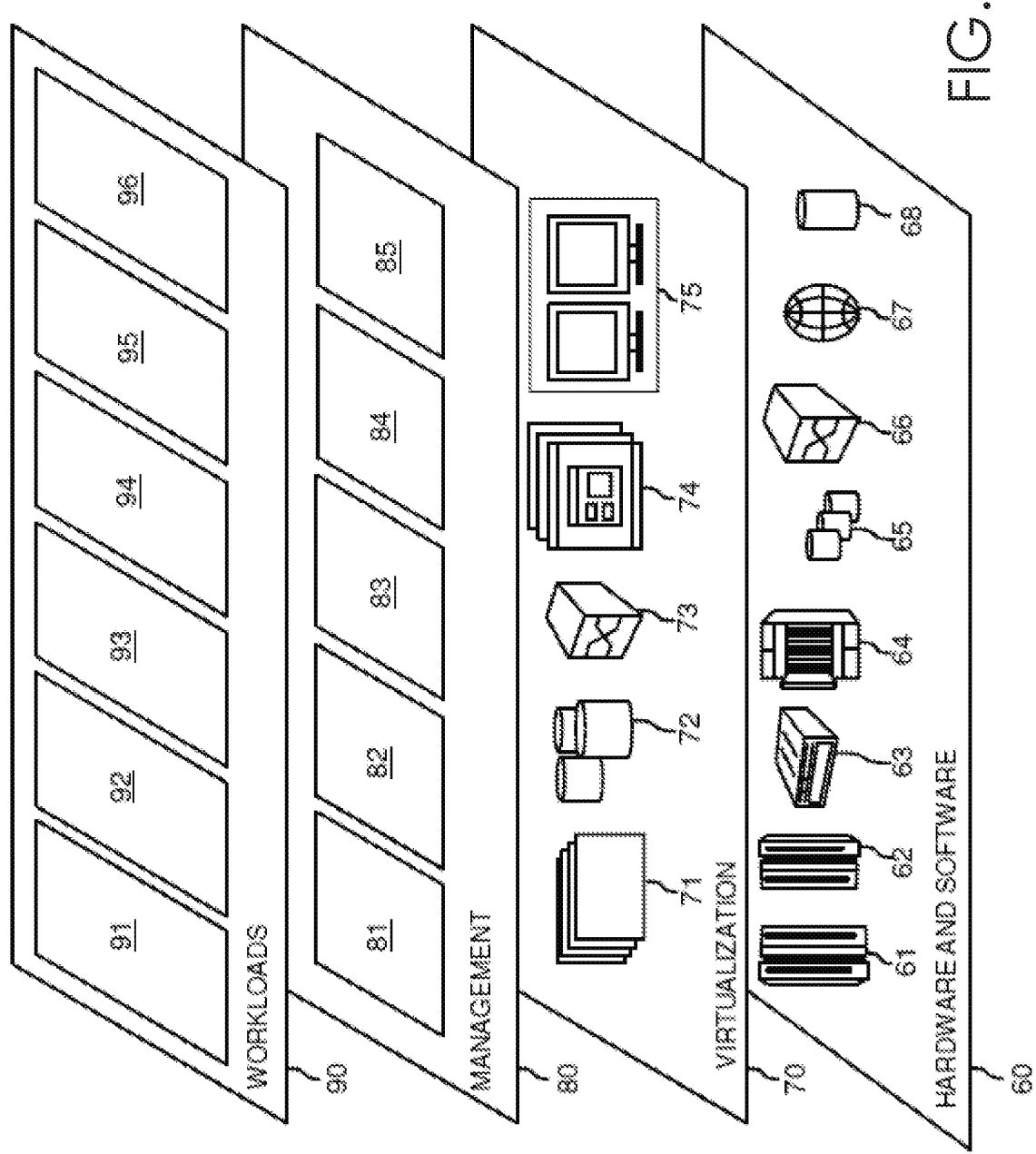
FIG. 7 illustrates a set of functional abstraction layers provided by cloud computing environment in one embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and code-mixed utterance processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented system comprising:
   a hardware processor;
   a memory device coupled with the hardware processor:
   the hardware processor configured to at least:
   create a language model corpus including multilingual alignment for training a combined language model, the language model corpus created from data sourced from a computer network and train the combined language model;
   create an adverse medication reaction corpus by analyzing data from online sources which include adverse medication reaction utterances and labeling an N-gram of an utterance in the adverse medication reaction utterances as a response to query;
   and generate a code-mixed utterance model to perform code-mixed utterances in a turn by turn dialogue, by at least adding additional output layer including at least a start vector, language vector, and a query vector including at least the labeled N-gram, which are additional to the combined language model's predicted next words, wherein the start vector encodes what word should start a response to an input utterance, and the language vector encodes what language out of multiple languages used in the code-mixed utterances should a next word of the response be in, wherein the code-mixed utterances represent utterances performed using multiple languages in a mixed manner in a conversation;
   and wherein the hardware processor is configured to align text from multiple languages by adversarial learning of a linear mapping between the multiple languages in an embedding space and refining alignments using geometric transformation.

2. The system of claim 1, wherein the hardware processor is further configured to augment the adverse drag reaction corpus with at least one paraphrase of at least one of the utterances, the paraphrase being in multiple languages corresponding to the multiple languages.

3. The system of claim 1, wherein the code-mixed utterance model includes a loss function including a 2-class softmax, in which a probability of a next utterance being a logical utterance with respect to a previous utterance is maximized.

4. The system of claim 1, wherein the hardware processor is further configured to perform a fuzzification of the n-gram.

5. The system of claim 1, wherein the combined language model includes a recurrent neural network.

6. The system of claim 1, wherein the code-mixed utterance model includes a recurrent neural network.

7. A computer program product comprising a computer readable storage medium having program instructions embodied therewith, the program instructions executable by a device to cause the device to:
   create a language model corpus including multilingual alignment for training a combined language model, the language model corpus created from data sourced from a computer network and train the combined language model;
   create an adverse medication reaction corpus by analyzing data from online sources which include adverse medication reaction utterances and labeling an N-gram of an utterance in the adverse medication reaction utterances as a response to query;
   and generate a code-mixed utterance model to perform code-mixed utterances in a turn by turn dialogue, by at least adding additional output layer including at least a start vector, language vector, and a query vector including at least the labeled N-gram, which are additional to the combined language model's predicted next words, wherein the start vector encodes what word should start a response to an input utterance, and the language vector encodes what language out of multiple languages used in the code-mixed utterances should a next word of the response be in, wherein the code-mixed utterances represent utterances performed using multiple languages in a mixed manner in a conversation;
   and wherein the device is caused to align text from multiple languages by adversarial learning of a linear mapping between the multiple languages in an embedding space and refining alignments using geometric transformation.

8. The computer program product of claim 7, wherein the device is further caused to augment the adverse drag reaction corpus with at least one paraphrase of at least one of the utterances, the paraphrase being in multiple languages corresponding to the multiple languages.

9. The computer program product of claim 7, wherein the code-mixed utterance model includes a loss function including a 2-class softmax, in which a probability of a next utterance being a logical utterance with respect to a previous utterance is maximized.

10. The computer program product of claim 7, wherein the device is further caused to perform a fuzzification of the n-gram.

11. The computer program product of claim 7, wherein the combined language model includes a recurrent neural network.

12. The computer program product of claim 7, wherein the code-mixed utterance model includes a recurrent neural network.

13. A computer-implemented method comprising:
   creating a language model corpus including multilingual alignment for training a combined language model, the language model corpus created from data sourced from a computer network and train the combined language model;
   creating an adverse medication reaction corpus by analyzing data from online sources which include adverse medication reaction utterances and labeling an N-gram of an utterance in the adverse medication reaction utterances as a response to query;
   and generating a code-mixed utterance model to perform code-mixed utterances in a turn by turn dialogue, by at least adding additional output layer including at least a start vector, language vector, and a query vector including at least the labeled N-gram, which are additional to the combined language model's predicted next words, wherein the start vector encodes what word should start a response to an input utterance, and the language vector encodes what language out of multiple languages used in the code-mixed utterances should a next word of the response be in, wherein the code-mixed utterances represent utterances performed using multiple languages in a mixed manner in a conversation; and aligning text from multiple languages by adversarial learning of a linear mapping between the multiple languages in an embedding space and refining alignments using geometric transformation.

14. The method of claim 13, wherein further including augmenting the adverse drag reaction corpus with at least one paraphrase of at least one of the utterances, the paraphrase being in multiple languages corresponding to the multiple languages.

15. The method of claim 13, wherein the code-mixed utterance model includes a loss function including a 2-class softmax, in which a probability of a next utterance being a logical utterance with respect to a previous utterance is maximized.

16. The method of claim 13, further including performing a fuzzification of the n-gram.

17. The method of claim 13, wherein generating the code-mixed utterance model includes training a recurrent neural network.

* * * * *